US012811853B2

(12) United States Patent
Ezrielev et al.

(10) Patent No.: US 12,811,853 B2
(45) Date of Patent: Nov. 24, 2026

(54) MANAGEMENT OF SYSTEMS USING TACIT STATEMENT PROPAGATION

(71) Applicant: Dell Products L.P., Round Rock, TX (US)

(72) Inventors: Ofir Ezrielev, Be'er Sheva (IL); Jehuda Shemer, Kfar Saba (IL); Nomi Michaels, Beit Shemesh (IL)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 19/034,052

(22) Filed: Jan. 22, 2025

(65) Prior Publication Data

US 2026/0214008 A1 Jul. 23, 2026

(51) Int. Cl.
*H04L 41/16* (2022.01)
*H04L 41/0894* (2022.01)
*H04L 41/5003* (2022.01)

(52) U.S. Cl.
CPC .......... *H04L 41/0894* (2022.05); *H04L 41/16* (2013.01); *H04L 41/5003* (2013.01)

(58) Field of Classification Search
None
See application file for complete search history.

(56) References Cited

U.S. PATENT DOCUMENTS 9,330,119 B2 5/2016 Chan et al.
11,373,123 B2 6/2022 Jana et al.
11,782,689 B1 * 10/2023 Costello .................... G06F 8/60 717/177
11,887,015 B2 1/2024 Fahmy et al.
11,954,129 B2 4/2024 Mopur et al.
2018/0278480 A1 * 9/2018 Prasad ................ H04L 41/0856

FOREIGN PATENT DOCUMENTS

EP 4472176 B1 * 6/2026

OTHER PUBLICATIONS

Abdillah et al. (Jul. 12, 2018). "Computer science students simulation in capturing tacit knowledge by using NGT for reducing traffic jam". International Journal of Engineering & Technology. doi: 0.14419/ijet.v7i3.12719. Retrieved from <https://arxiv.org/pdf/1807.06082> on Jan. 28, 2025 (5 pages).

Koivisto et al. (Sep. 19, 2023). "Pitfalls in Effective Knowledge Management: Insights from an International Information Technology Organization". arXiv:2304.07737v2. Retrieved from <https://arxiv.org/pdf/2304.07737> on Jan. 28, 2025 (29 pages).

(Continued)

*Primary Examiner* — Natisha D Cox
(74) *Attorney, Agent, or Firm* — WOMBLE BOND DICKINSON (US) LLP

(57) ABSTRACT

Methods, systems, and devices are provided for managing operation of a distributed system. To manage the system, tacit statements from stakeholders to the distributed system may be used to infer intents for components of the distributed system. The intents may be used to train agents. The intents may be based on portions of the tacit statements deemed to be explicitly relevant or inferred as being relevant to the components. Tacit statements may be inferred as relevant based on relationships between the components.

20 Claims, 12 Drawing Sheets

(56) References Cited

OTHER PUBLICATIONS

Vidgof et al. (Apr. 9, 2023). "Large Language Models for Business Process Management: Opportunities and Challenges". arXiv:2304.04309. Retrieved from <https://arxiv.org/pdf/2304.04309> on Jan. 28, 2025 (16 pages).
Packer et al. (Feb. 12, 2024). "MemGPT: Towards LLMs as Operating Systems". arXiv:2310.08560. Retrieved from <https://arxiv.org/pdf/2310.08560> on Jan. 28, 2025 (13 pages).
Donadel et al. (Jul. 31, 2024). "Can LLMs Understand Computer Networks? Towards a Virtual System Administrator". arXiv:2404.12689v2. Retrieved from <https://arxiv.org/pdf/2404.12689> on Jan. 28, 2025 (10 pages).
Dandoush et al. (Mar. 20, 2024). "Large Language Models meet Network Slicing Management and Orchestration". arXiv:2403.13721. Retrieved from <https://arxiv.org/pdf/2403.13721> on Jan. 28, 2025 (14 pages).
Mani et al. (Aug. 11, 2023). "Enhancing Network Management Using Code Generated by Large Language Models". arXiv:2308.06261. Retrieved from <https://arxiv.org/pdf/2308.06261> on Jan. 28, 2025 (8 pages).
Junior et al. (Jun. 6, 2024). "Are Large Language Models the New Interface for Data Pipelines?". arXiv:2406.06596v1. Retrieved from <https://arxiv.org/pdf/2406.06596v1> on Jan. 28, 2025 (6 pages).

* cited by examiner

MANAGEMENT OF SYSTEMS USING TACIT STATEMENT PROPAGATION

FIELD

Embodiments disclosed herein relate generally to management of data processing systems. More particularly, embodiments disclosed herein relate to systems and methods for management of systems using tacit statements.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
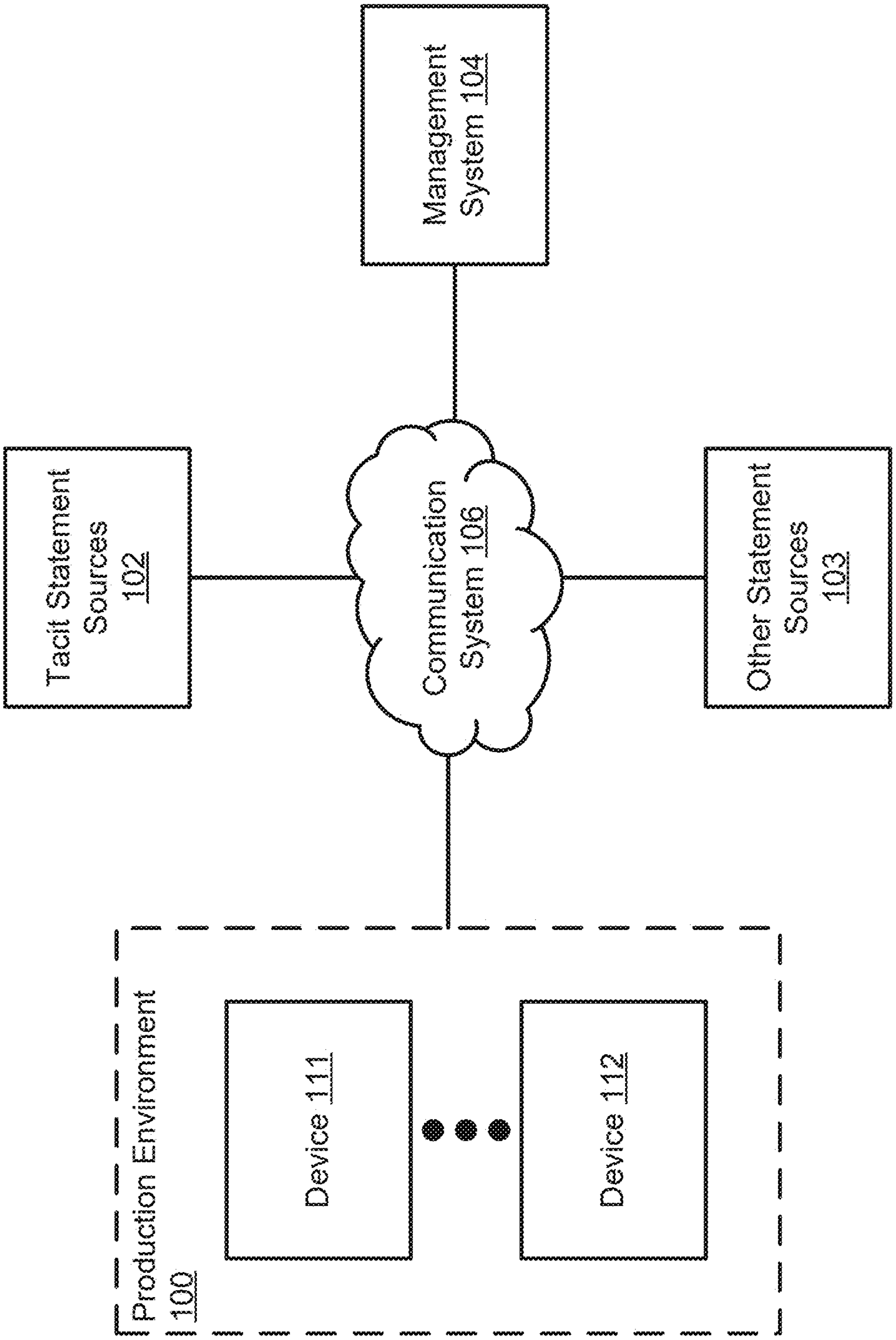
FIG. 1 shows a block diagram illustrating systems in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems (e.g., may form a distributed system) that may provide, at least in part, computer implemented services. The computer implemented services may be provided to any type and/or number of other devices and/or users of the data processing systems. Furthermore, the provided computer implemented services may be of any quantity and/or type of such services.

To provide desirable computer implemented services, the distributed system may need to operate in a particular manner. However, intent regarding what constitutes desirable computer implemented services may not be explicitly defined by stakeholders of the distributed system. For example, rather than explicitly defining the desired services, the stakeholders may only express tacit statements that are incomplete, unaligned with the operation of the distributed system, and/or that otherwise may not be directly usable to manage operation of the distributed system so that desirable computer implemented services are provided.

To improve the likelihood of desirable computer implemented services being provided, the operation of the distributed system may be managed using dynamically updated intents and corresponding policies using tacit statements. As tacit statements become available (and/or the distributed system changes), interpretation of the intent may be rederived to take into account new information. The intent may then be used to drive management of the distributed system so that the derived intent used to manage the system is more likely to align with the actual intent of the stakeholders (e.g., even if the stakeholders cannot explicitly define their intent).

Additionally, trained agents may be used to dynamically manage the distributed system. The trained agents may be trained to effectuate the intent with respect to the distributed system. To do so, a simulation of the distributed system may ran under a variety of conditions. An agent may be used to direct operation of the distributed system under the conditions. The resulting operation of the distributed system may be graded with respect to the intent, and may be used to update operation of the agent (e.g., may be updated using a learning process such as reinforced learning).

To provide for robustness, an event stream may be established by a trained generative machine learning model. The event stream may be used to drive operation of the simulation to present the agent with a variety of conditions that may impact real systems. The event stream may be established, in part, using any of the tacit statements and/or intent, and/or generalized versions of previously encountered events that may be customized to simulate a broader range of conditions. Consequently, the resulting simulation may present a broader range of conditions to the agent than has even been encountered by real systems, thereby training the agent to handle a broader range of conditions which may be encountered in the future.

Stakeholders may have different intents with respect to different components of the distributed system. To identify these respective intents, statements from the stakeholders may be filtered for relevancy. Relevancy may be established explicitly or inferentially. Explicit relevancy may be based on content or metadata of the statements. Inferred relevancy may be established based on relationships between components, and explicit relevancy (e.g., a statement that is explicitly relevant to a first component may be inferred as relevant to another component based on a relationship between the two component). By doing so, statements that are likely relevant to establishing intent for a component may be identified without requiring that the statement have an explicit call out for relevancy to the component.

Thus, embodiments disclosed herein may address, among others, the technical problem of system management. The disclosed embodiments may do so by using information that may be usable to identify intent for the distributed system using information (e.g., tacit statements) that may not otherwise be used to manage the operation of the distributed system. Accordingly, the inferred intent of stakeholders may be more likely to align with the actual intent of the stakeholders. Consequently, the computer implemented services provided by the distributed system may be more likely to be deemed desirable by the stakeholders.

In an embodiment, a method for managing a distributed system is disclosed. The method may include deploying a plurality of trained agents to the distributed system, each trained agent of the plurality of trained agents being adapted to manage, at least, operation of a corresponding component of the distributed system responsive to changes in state of the corresponding component, and each trained agent being trained based on a portion of tacit statements deemed to be relevant to an intent of stakeholders with respect to the corresponding component of the distributed system; updating, by each trained agent of the plurality of trained agents, the operation of the corresponding component of the distributed system over time to guide an actual state of the distributed system to a desired state; and while the operation is updated, providing, by the distributed system, desired computer implemented services.

For a first trained agent of the plurality of trained agents, a first portion of tacit statements, deemed to be relevant to a first intent of the stakeholders with respect to a first component of the distributed system, may include a first tacit statement that is explicitly relevant to the first component of the distributed system; and a second tacit statement that is not explicitly relevant to the first component of the distributed system but is inferred as being relevant to the first component based on relationships between components of the distributed system.

The relationships may be dependencies.

The second tacit statement may be inferred as being relevant based on a directed acyclic graph, and a propagation rule.

The directed acyclic graph may include nodes corresponding to the components, and edges between the nodes corresponding to the relationships.

The second tacit statement may be explicitly relevant to a second component of the components of the distributed system, the first component may be related to the second component via an edge of the edges, and the propagation rule may indicate that the second tacit statement is relevant to the first component based on the edge.

The propagation rule may indicate that the second tacit statement is to be sequentially propagated from a nodes of the nodes corresponding to the second component to other nodes via the edges.

The propagation rule may limit a number of the edges across which second tacit statement is allowed to be propagated.

Each trained agent of the plurality of trained agents may operate independently.

The tacit statements may include at least one derived tacit statement based on public information from the stakeholders, the tacit statements being private statements.

The tacit statements may indicate at least one goal of the stakeholder with respect to the distributed system that is to be accomplished.

The goal may not be defined in terms of operation of the distributed system.

The distributed system may be a production system of the distributed system that contributed to, at least in part, primary computer implemented services provided by the distributed system.

In an embodiment, a non-transitory media is provided. The non-transitory media may include instructions that when executed by a processor cause, at least in part, any of the methods discussed above to be performed.

In an embodiment, a data processing system is provided. The data processing system may include the non-transitory media and a processor and may, at least in part, perform any of the methods discussed above when the computer instructions are executed by the processor.

Turning to FIG. 1, a block diagram illustrating a system in accordance with an embodiment is shown. The system shown in FIG. 1 may be a distributed system that provides computer implemented services.

The computer implemented services may include any type and/or quantity of services. The services may include, for example, database services, data processing services, electronic communication services, and/or any other services that may be provided by one or more computing devices. Other types of services may be provided by the system shown in FIG. 1 without departing from embodiments disclosed herein.

To provide the desired services, various components of the distributed system may need to have access to hardware resources, host corresponding software components, have particular configuration settings (e.g., impact operation of hardware/software components), etc. When so configured, the distributed system may provide desired computer implemented services.

However, over time the distributed system may drift from a state in which it is able to provide the desired computer implemented services. For example, hardware components may be replaced or lost (e.g., failure, removal for other reasons), software components may be changed (e.g., uninstalled, fail to operate properly, etc.), configuration settings may be changed, and/or other events may occur that change a state of the distributed system so that the distributed system is unable to provide the desired computer implemented services.

Further, the desired computer implemented services may also change over time. For example, users of the distributed system may desire to have other types of services be provided than those originally performed. Consequently, drift in the desired services may likewise render the distributed system unable to provide the desired computer implemented services.

Additionally, various mismatches in expectations between services that are requested to be performed and those that are actually desired may cause the distributed system to be unable to provide desired computer implemented services. For example, when services are initially requested, various configuration may be changed, hardware/software components may be changed, and other actions may be performed with respect to the distributed system to place it in a state believed to enable it to provide desired computer implemented services. However, once so configured, the actual services that the distributed system may be able to provide may be found to not be desired because the expressed desires for services may mismatch that which is actually desired.

Such issues could arise, for example, when users (or other stakeholders, such as administrators) of a distributed system attempt to express the desired services. The expression by the users may be in a language familiar to the users. In contrast, administrators or other persons tasked with managing the distributed system may not be familiar with the style of expression used by the users causing the administrators to misinterpret the services that are actually desired by the users. Consequently, when administrators attempt to place the distributes system in a state compatible with providing the desired computer implemented services, the resulting state may differ from that required to provide the truly desired computer implemented services.

In general, embodiments disclosed herein relate to systems, devices, and methods for managing operation of a distributed system that provides desired computer implemented services in a manner that improves the likely of the actual services provided by the distributed system to be desirable. To manage the operation of the distributed system, tacit statements regarding goals to be accomplished (e.g., using the distributed system, and/or portions thereof) may be collected as well as other statements (e.g., other tacit statements) regarding the goals, preferences for achieving the goals, and/or other information usable to better interpret the tacit statements. These statements may include information, albeit not in a readily digestible form, usable to ascertain an intent regarding how the distributed system should operate to provide desired computer implemented services.

Once collected, the statements may be analyzed to obtain intermediate representations of the disparate pieces of information regarding how the distributed system should operate. The intermediate representation may conform to a schema, which in turn may enable the intermediate representations to be used to establish an intent for use of the distributed system.

The resulting intent may then be used to, for example, manage operation of components of the distributed system. For example, the intent may be used to ascertain configuration settings, software/hardware components, and/or other information regarding how the distributed system should operate (e.g., a desired state) to provide desired computer implemented services. The aforementioned information and/or the intent itself may be used to drive automation frameworks hosted by data processing systems of the distributed system to conform the states of the distributed systems to the desired state of the distributed system.

For example, the desired state may be compared to the actual state to identify any deviations. Remediation actions may then be selected and performed to address the deviations. The remediation actions may include, for example, changing hardware/software components, changing configurations, etc.

The resulting intent may also be used to manage the operation of the components of the distributed system using trained agents. The trained agents may be tasked with modifying operation of the distributed system over time. To do so, agent architectures (e.g., machine learning models) may be trained using one or more optimization goals based on the intent, and a simulation of operation of the distributed system. The simulation may be used, for example, to train the agent architectures to modify operation of the distributed system to meet the optimization goals. Once trained, the trained agents may be deployed and may, at least in part, manage operation of the distributed system (e.g., by reconfiguring it over time, modifying software/hardware of the distributed system, etc.). The trained agents may manage the operation of the distributed system to, for example, improve the likelihood of the computer implemented services provided by the distributed system being deemed desirable by various stakeholders.

During the training process, simulated operation of the distributed system may be perturbed using events that are based on historic information but selected and implemented using a generative trained machine learning model. For example, the generative trained machine learning model may use a history of events/operation of the simulated distributed system as a prompt (e.g., to predict future events), and may used generalized versions of historic events that impacted actual operation of the distributed system. The generalized versions may allow for simulation of new, never actually encountered events to be incorporated into the simulation (e.g., while being grounded in real events that could occur). The aforementioned approach may enable the agents to be proactively trained to effectively deal with both historic and theoretical events that have never been actually encountered by real distributed systems.

To manage the distributed systems, different intents with components of the distributed systems may be derived based on sets of relevant tacit and/or other statements. Consequently, different policies and/or agents may be generated for the different components. To identify intent with respect to different components, the statements (e.g., tacit or otherwise) may initially be associated with the respective components based on the statements. Then, some of the statements may be propagated based on relationships between components. In other words, some of the statements that may not be explicitly relevant to one component may be inferred as being relevant to the one component based on relationships to other components.

By doing so, embodiments disclosed herein may address, among others, the technical problem of state management in distributed systems. The aforementioned system may do so by, for example, using tacit and/or other statements to identify intent and in turn desired states for the distributed system. By using tacit statements, the disclosed system may be more likely to successfully provide desired computer implemented services by (i) reducing information loss (e.g., administrators may not be able to keep track of all descriptions of desired outcomes), (ii) interpreting the tacit statements in a manner that facilitates direct intent identification, and (iii) identification of intents in a manner that facilitate deviations in operation of distributed systems from that required to provide desired computer implemented services.

For example, tacit statements, in contrast to statements of intent, may (i) be incomplete, (ii) may be couched in language that is not aligned with language used to describe a system which will be used to accomplish a goal, (iii) may be agnostic to the system that will be used to accomplish the goal, (iv) may be in conflict with other tacit statements, and (v) may accumulate over time. Many such statements may be selectively ignored/discarded by administrators. Consequently, administrators may be operating on an incomplete understanding of the actual desires of users or other stakeholders. To maintain an up to date and as complete as possible understanding the desires of the stakeholders, the tacit statements may be stored and used dynamically over time to derive static intents (e.g., with respect to a particular system) of time. By dynamically deriving the static intents over time, changes in systems, expressed desires (e.g., in the form of tacit statements), and/or other factors may be taken into account in system management. Consequently, the state of the distributed system may be dynamically updated over time to improve the likelihood of desired computer implemented services being provided.

To provide the above noted functionality, the system of FIG. 1 may include production environment 100, tacit statement sources 102, other statement sources 103, management system 104, and communication system 106. Each of these is discussed below.

Production environment 100 may facilitate the provisioning of desired computer implemented services. To do so, production environment 100 may host various hardware and software components, which may be configured in various manners. To manage the operation and configuration of these components, devices (e.g., 111-112, any number of them may be part of production environment 100) of production environment 100 may host automation frameworks or other types of management layers. The automation frameworks may include functionality to monitor operation of the components of devices 111-112, provide any of the information to other components, obtain instructions and/or information from other devices, and use the obtained instructions/information to modify operation of any of the components of the devices. Refer to FIGS. 2C-2F for additional details regarding production environment 100, and devices 111-112.

Management system 104 may manage the operation of production environment 100. To manage the operation, management system 104 may (i) obtain tacit statements from tacit statement sources 102, (ii) obtain other statements from other statement sources 103, (iii) use the statements to ascertain an intent regarding goals to be achieved using production environment 100, (iv) obtain policies, instructions, trained agents, and/or other information usable to manage production environment 100 using the intent, information regarding operation of production environment 100, and/or other information (e.g., any of which being referred to as "management information"), (v) initiate changes in operation of production environment 100 using the obtained management information, (vi) store and manage the statements obtained from tacit statement sources 102, other statements sources 103, and/or other sources of information, and/or perform other actions to improve a likelihood of production environment 100 providing computer implemented services in a manner that is deemed to be desired by users of the services, managers or production environment 100, and/or other stakeholders that may have an interest in production environment 100.

Tacit statement sources 102 may generate, obtain, and/or otherwise provide tacit statements to management system 104. Tacit statement sources 102 may include computing devices through which persons may express desired goals for use of production environment. For example, tacit statement sources 102 may host portals (e.g., interfaces) through which users of computing devices may provide the tacit statements. It will be appreciated that tacit statement sources 102 may obtain the tacit statements via any process without departing from the invention. In the context of a portal, for example, an interface may be presented to an entity (e.g., person, computing device/software) through which information may be input. The interface may accept free text information (or audio which may be transcribed to text) enabling the entities to express desired outcomes/goals without adhering to any schema. Consequently, the received information may, as noted above, be incomplete, may not be specific with respect to any system (or use the system's language such as key performance indicators relevant to production environment 100), may conflict with other tacit statements, may be open to multiple interpretations, and/or otherwise may not directly express an intent that may be directly usable to ascertain how to manage production environment 100.

Other statement sources 103 may generate, obtain, and/or otherwise provide other statements to management system 104. Other statement sources 103 may include computing devices through which public or otherwise expressed desired goals for use of production environment 100 may be identified. In contrast to tacit statement sources 102, other statement sources 103 may sort through publicly available statements (e.g., the Internet, other sources) made by entities (e.g., businesses) that may have an interest in production environment 100. For example, public statement made by an organization may be collected and stored. These statements may be analyzed to ascertain whether any express goals that may be accomplished, at least in part, using production environment 100. When such statements are identified, copies (or portions thereof, or information derived from the statements, refer to intermediate representations discussed below) may be stored for future use.

Consequently, tacit statement sources 102 and other statements sources 103 may provide tacit statements (e.g., collections of such statements) which may be used to infer an intent with respect to production environment 100. The identified intent may take into account more information than may typically be used in managing operation of productions environments. For example, in many cases simple interviews of users of a production environment may be used to attempt to identify the intent. However, the resulting identified intent may be incorrect because of the limited information taken into account during the intent derivation process. In contrast, the disclosed approach may facilitate intent identification and subsequent use using broader sources of information that may otherwise not be used in intent derivation. Therefore, the resulting identified intent may be more likely to accurately reflect that envisioned by various stakeholders (e.g., users, administrators, etc.) in production environment 100.

For example, by inferring relationships between tacit statements and intent regarding different component of the system through propagation, the inferred intent may be more likely to be accurate (e.g., without requiring high degrees of explicitness regarding applicability of tacit statement be expressed). Accordingly, the resulting intents may be more likely to accurately reflect that of the stakeholders.

When providing their functionality, production environment 100, tacit statement sources 102, other statement sources 103, and/or management system 104 may perform all, or a portion, of the flows and/or methods shown in FIGS. 2A-2F and 3A-3D.

Any devices (and/or components thereof) included in the system of FIG. 1 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with a communication system (e.g., 106) utilized by production environment 100, tacit statement sources 102, other statement sources 103, and/or management system 104 to, for example, cooperate with one another to facilitate the architectural regulation framework.

In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2F. These data flow diagrams may illustrate how data may be obtained and used within the system of FIG. 1.

In the data flow diagrams, flows of data and processing of data are illustrated using different sets of shapes. In the context of these data flow diagrams, a first set of shapes (e.g., 200, 202, etc.) is used to represent data structures, a second set of shapes (e.g., 204, etc.) is used to represent processes performed using and/or that generate data, and a third set of shapes (e.g., 108, etc.) is used to represent large scale data structures such as databases.

Figure 2A:
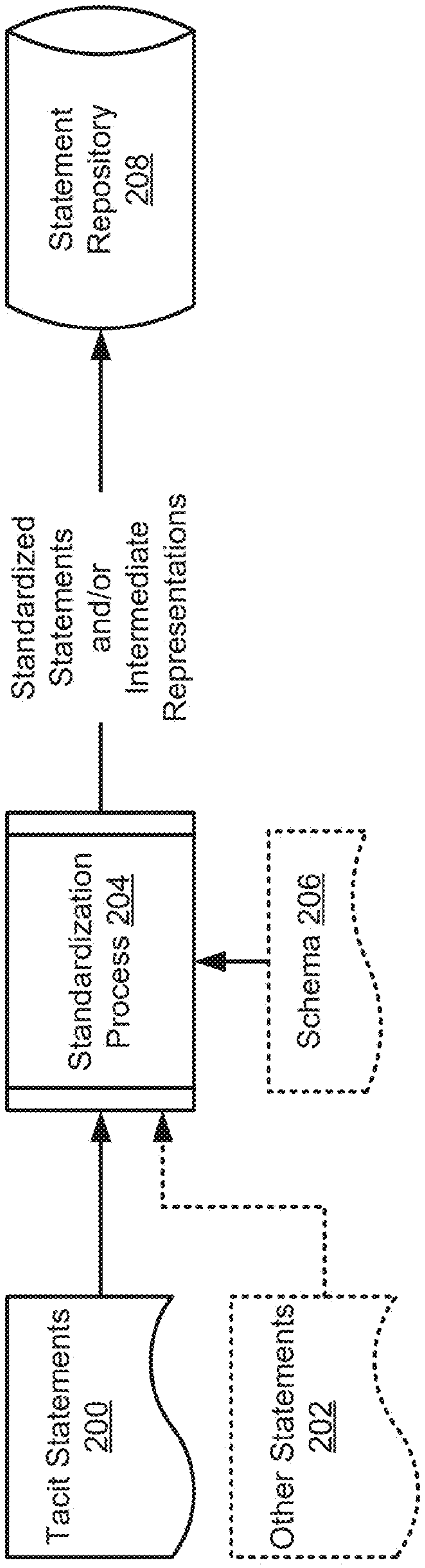
FIGS. 2A-2F show data flow diagrams illustrating processing of data in accordance with an embodiment.

Turning to FIG. 2A, a first data flow diagram in accordance with an embodiment is shown. The first data flow diagram may illustrate data used in and data processing performed in acquisition and/or management of statements.

As discussed above, to identify an intent for a production system, any number of statements (e.g., 200, 202) may be obtained, and managed for future use. To obtain tacit statements 200, information from any number of tacit statement sources may be obtained.

Tacit statements 200 may be obtained, for example, (i) directly from persons or entities that may wish to use a production system to accomplish various goals (e.g., via interviews, text acquisitions via interfaces, portals for information collection, etc.), (ii) indirectly from historic documents (e.g., previously captured information such as emails, text captured via portals, documents, etc.), and/or via other methods. Generally, tacit statements 200 may be obtained from entities that are stakeholders with respect to production systems, and such tacit statements 200 may not be publicly available.

In contrast to tacit statements 200, other statements 202 may be obtained, for example, (i) from publicly available information (e.g., public statements, information available from the Internet, etc.), (ii) from semi-private data sources (e.g., internal announcements, etc.), and/or via other methods. Generally, other statements 202 may be obtained from entities that are stakeholders with respect to production systems, and such other statements 202 may not be publicly available.

Once any of the statements are obtained (e.g., statements may be obtained at different points in time), standardization process 204 may be performed. During standardization process, the content of the statements may be regularized for efficient future use. For example, as part of the process of obtaining the tacit statements, various natural language processing, formatting, and/or other processes may be performed on raw information to structure the information into a predetermined format. The format may also include metadata (e.g., time, place, manner of acquisition, etc.) usable to contextualize the information.

During standardization process 204, a schema (e.g., 206) or other data structure defining how data is to be placed in a standardized format may be used to process the statements. The schema may specify, for example, encoding, metadata requirements, structuring, etc.

In an embodiment, schema 206 also defines how to establish intermediate representations based on various statements. The intermediate representations may be collections of information elements and relationships between the information elements. The information elements and relationships may be based on content of a corresponding statement.

For example, the information elements may be standardized so that natural language processing or other types of processes performed on a statement may facilitate acquisition of the information elements. The information elements may include (i) a hierarchy level based on restrictiveness of a portion of the statement (e.g., may be divided into levels such as required, optimize, and optional but nice to have; and/or may include any number), (ii) an aspect that is discussed in the statement (e.g., usability, cost availability, other business or technical outcomes, etc.), (iii) an instance for an aspect (e.g., a cost of less than $30,000), (iv) basis that justify the aspect (e.g., for cost of less than $30,000, the basis may be that is the maximum for a process to be profitable), and/or other types of information elements.

Collections of information elements may be related and thereby effectively reflect information content of a statement. For example, consider an example tacit statement such as "The cost should be up to $30,000, latency resilience to spikes and energy usage are important and it could be nice to be more sustainable". This statement may include examples of each of the hierarchy information elements in that (i) the cost of $30,000 is a requirement (e.g., the language "up to" indicating a limit), (ii) the latency resilience and energy usage are not limited but are to be optimized (e.g., the language "are important"), and (iii) sustainability being indicated as a desirable quality and therefore being a nice to have level (e.g., the language "it could be nice" indicating desirable but that should not be prioritized over latency resilience and energy use). Consequently, when analyzed using natural language processing to extract hierarchy, aspect, and other types of information elements, the following example intermediate representation may be obtained:

- Hierarchy: Required
  - Aspect: Cost
  - Instance: <=30 K$
- Hierarchy: Optimize [refinement opportunity—inquire for possible importance differences between the instances]
  - Aspect: Latency delta on spike [refinement opportunity—inquire for the expected range/likelihoods of spikes]
  - Instance: 1
  - Aspect: Energy usage [refinement opportunity—inquire for the why to provide more refined evaluation structure]
  - Instance: 2
- Hierarchy: Nice to have
  - Aspect: Sustainability Thus, in the above example, aspect and instances may be related to different hierarchies, and instances may define examples of the corresponding aspects. Any of the information elements and relationships may be used through natural language processing and/or deterministic rule application (e.g., which may be defined by rules/instructions included in schema 206, for example, may specify word libraries and corresponding meanings such that natural language processing may identify such words in statements and generate information elements/relationships based on the identified words).

However, it will be appreciated that other modalities for obtaining such information may be used. For example, trained generative machine learning models such as large language models and corresponding prompts (e.g., to generate intermediate representations) may be used to analyze and generate intermediate representations and/or standardized statements without departing from embodiments disclosed herein. In the case of a large language model, prompts such as "does this statement establish any requirements" along with a given statement may enable information elements to be identified. Similar prompts may be used to identify other types of information elements.

Once the intermediate representations and/or standardized statements are obtained, they may be stored (e.g., along with metadata) in statement repository 208 for future use. While shown as being generated and stored in FIG. 2A, it will be appreciated that intermediate representations may be generated at other points in time. Consequently, statement repository 208 may store standardized statements which may be used at later points in time to generate intermediate representations.

Thus, using the data flow shown in FIG. 2A, embodiments disclosed herein may facilitate acquisition and management of statements usable to manage operation of production systems (e.g., any type of computer system that may provide any type of service).

Figure 2B:
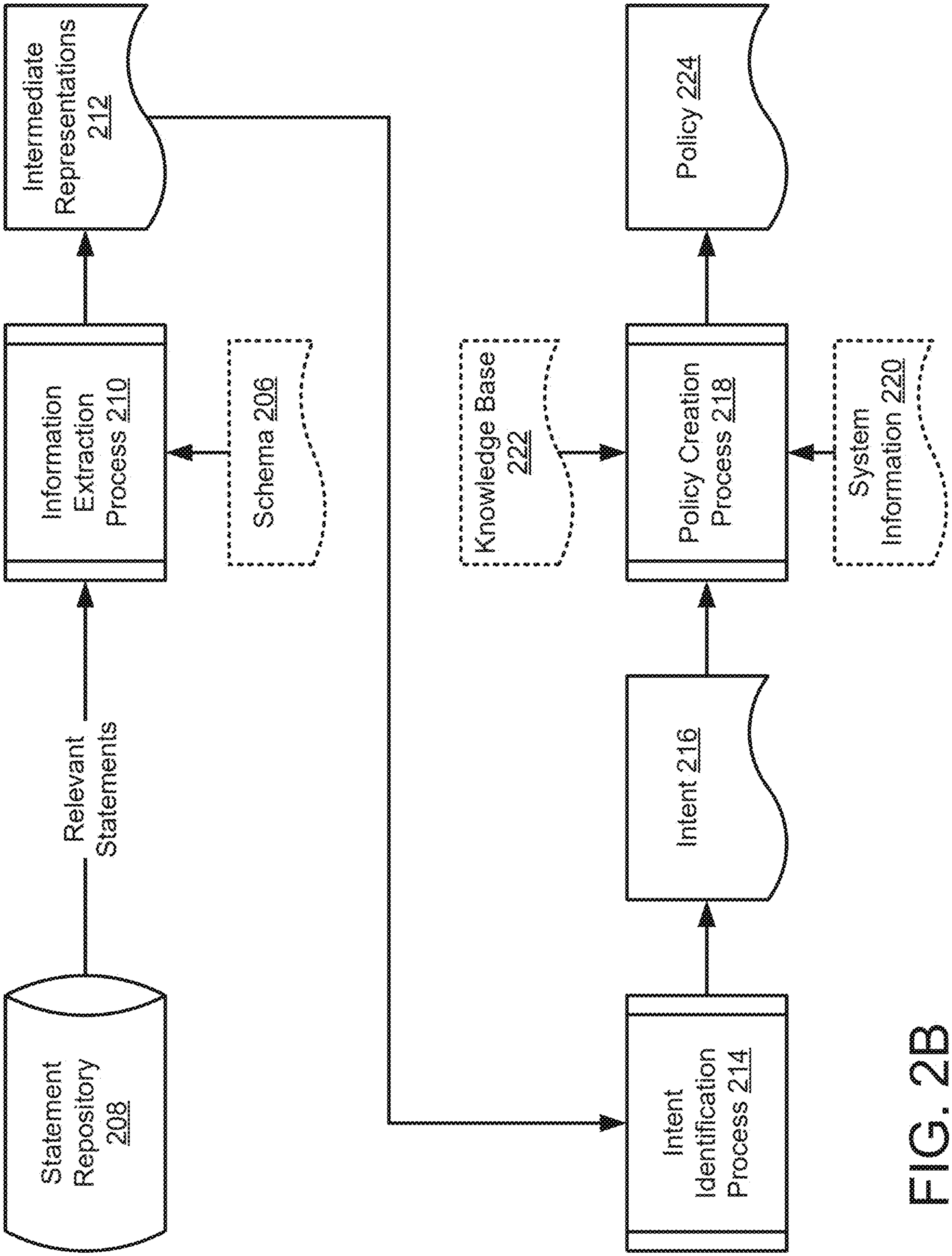

Turning to FIG. 2B, a second data flow diagram in accordance with an embodiment is shown. The second data flow diagram may illustrate data used in and data processing performed in management of production systems using, at least in part, tacit statements.

To manage the production systems, information from statement repository 208 may be obtained to attempt to identify an intent for use with a production system. The information may include standardized statements (e.g., tacit and/or others), intermediate representations of such statements, metadata, and/or other information. In a scenario in which statements (as opposed to intermediate representations) are obtained, information extraction process 210 may be performed to obtain intermediate representations 212 of the statements. As discussed with respect to FIG. 2A, natural language processing, language models, schemas (e.g., 206), and/or other information may be used to derive intermediate representations 212 from the statements.

The relevant statements may include all, or a portion, of statements that may relate to a goal (e.g., tacit statements from multiple stakeholders, publicly made policy statements by an organization of which the stakeholders are members, etc.) for a production system. The relevant statements may be filtered from others on any basis (e.g., metadata may be stored that allows for stakeholders that made the statements to be identified, services that are desired to be identified, goals to be achieved may be identified, statements that are temporally relevant such as within a particular time period, etc.) and using any method (e.g., similarity analysis, filtration, etc.).

Once intermediate representations 212 are obtained, intent identification process 214 may be performed. During intent identification process 214, intermediate representations 212 may be analyzed to identify intent 216. The analysis may use a set of rules or other process to convert intermediate representations 212 to intent 216.

In some cases, conflicts between different intermediate representations (e.g., corresponding to different statements) may arise. The conflicts may be addressed using any resolution method such as on a temporal basis (e.g., presuming that more recent statements are more accurate), on a weighted basis (e.g., most common is more accurate), on an authority basis (e.g., statements from some entities may be given more weight than others), etc. The conflicting statement that is deemed less accurate may be ignored or otherwise not incorporated into the resulting intent.

For example, using the example intermediate representation discussed above with respect to FIG. 2A, an example intent may specify:

Intent [system-specific]
  System cost<=30 K$
Objectives to optimize: [without refinement, equal weight]
  Objective 1—reduce the likelihood-weighted latency delta from baseline during spikes
  Objective 2—reduce energy usage
Nice to have objectives:
  With objectives 1 and 2 rigid, try to optimize for sustainability (with possibly globally-defined measure of sustainability metric, or one that can be refined by the customer)

The above example intent may be usable to identify relevant policies, system configurations, and/or other aspects of operation of a production system that may be placed into condition in which it is more likely to be able to provide computer implemented services that meet an actual intent of stakeholders for the system.

To obtain intent 216, for example, a template may be used and any of the information elements and relationships from intermediate representations 212 may be used to populate the template. The resulting populated template may be natively usable by subsequent processes to manage systems.

For example, once intent 216 is obtained, policy creation process 218 may be performed. During policy creation process 218, a policy (e.g., 224) may be established for the production system to manage operation. Policy 224 may include any type and quantity of information usable by management frameworks for the production system which may enforce policy 224 on the production system.

To obtain policy 224, information from a knowledge base (e.g., 222) that includes historic or other types of knowledge regarding how to effectuate intents using policies and system information (e.g., 220) about the system may be obtained and used to define policy 224. Any policy 224 defining process may be performed (e.g., templating, optimization, etc.).

Figure 2C:
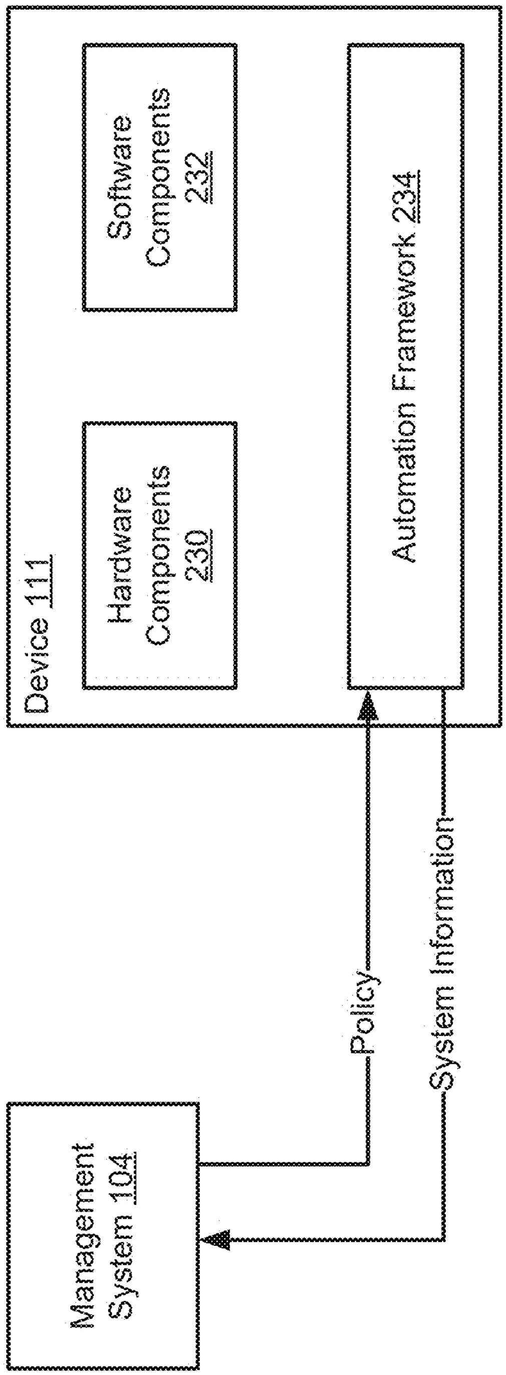

Thus, policy 224 may be obtained and used to manage operation of a production system. Refer to FIG. 2C for additional information regarding managing operation of the production system using policy 224.

Returning to the discussion of FIG. 2B, intent identification process 214 and/or policy creation process 218 (and operations leading up to them) may be performed iteratively, at different points in time, in response to occurrences of events (e.g., changes in available statements, changes in system information 220, which may include any information about the production system and may, therefore, capture dynamic changes to the system such as hardware/software/configuration changes), etc. Thus, intent 216 and policy 224 may be dynamically derived overtime as (i) available information usable to obtain intents changes, and/or (ii) the production system changes.

Thus, embodiments disclosed herein may facilitate dynamic response of productions systems to changing conditions and available information.

Turning to FIG. 2C, a third data flow diagram in accordance with an embodiment is shown. The third data flow diagram may illustrate data used in and data processing performed in managing devices of production systems.

To manage the devices (e.g., individual data processing systems, collections of data processing systems such as cloud architectures, etc.), management system 104 may distribute corresponding policies (e.g., when new policies are available) to the devices. When obtained by the devices, automation frameworks (e.g., 234) that manage operation of the devices may digest the policies and/or provide system information to management system 104.

The policy may specify specific changes, goal states, and/or other information usable to ascertain whether device 111 is in a desired operating state. Based on the information, the automation frameworks may modify operation of various hardware components 230 and/or software components 232 of device 111 to place it into the desired operating state (e.g., specified by the policy, reachable by performing instructions specified by the policy, etc.). The changes may include, for example, enabling/disabling/configuring the hardware and/or software components, instantiating new software components, etc. It will be appreciated that device 111 may perform any number and types of actions to modify its operation based on the policy.

Thus, using the flow shown in FIG. 2C, embodiments disclosed herein may facilitate management of distributed systems over time using policy. However, it will be appreciated that other modalities for managing distributed system may be used without departing from embodiments disclosed herein.

Figure 2D:
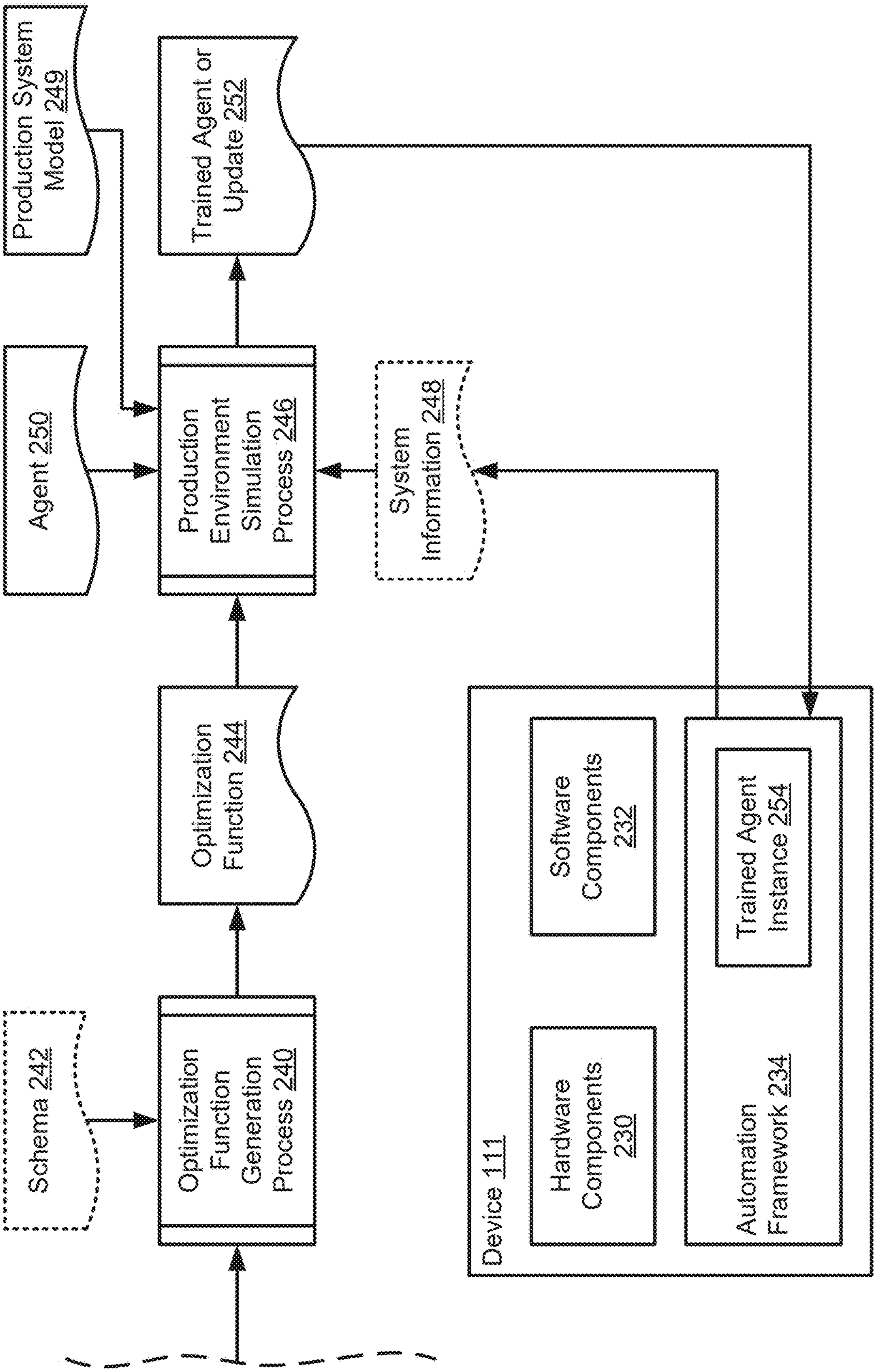

Turning to FIG. 2D, a fourth data flow diagram in accordance with an embodiment is shown. The fourth data flow diagram may illustrate data used in and data processing performed in managing devices of production systems using trained agents.

To manage a distributed system using trained agents, optimization function generation process 240 may be performed. During optimization function generation process 240, an optimization function (e.g., an objective function) may be defined. The optimization function may be defined using schema 242, intent 216, intermediate representations 212, and/or any relevant statements.

For example, schema 242 may define (i) a structure of the optimization function such as a template, and (ii) how information from intent 216, intermediate representations 212, and/or any relevant statements may be used to populate the structure. In an example, schema 242 may specify an objective function structure that uses different hierarchy levels (e.g., required, optimized, nice to have, etc.) from an intent as weights, and different aspects/instances as weighted goals. Using the example intent discussed above, a objective function may have the form of A1*(Actual Value 1—Goal Value 1)+A2*(Actual Value2—Goal Value 2) . . . for any number of such terms. Each term (e.g., A1*(Actual Value 1—Goal Value 1) may corresponding to a hierarchy level. The weight (e.g., A1) of each term may be based on the hierarchy level (e.g., highest hierarchy level may have a weight of 1, second highest may have a weight of 0.8, etc., different relationships between weights and hierarchy level may be used). The Actual Value may be obtained from operation of the system (e.g., the input), and the corresponding Goal Value may be from the intent (e.g., the example intent above may indicate that the likelihood-weighted latency delta from baseline during spikes is to be minimized, so the Goal Value may be zero in this example, and the actual latency delta may be obtained and used as input). The objective function may, thus, take as input operation of the distributed system and output a quantification of how well the distributed system is meeting the intent.

While described with respect to intent, the intermediate representations and/or statements themselves (on which the intent may be based) may be used to define optimization functions without departing from embodiments disclosed herein. Further, other types of information may be used in establishing of optimization function 244. For example, service level agreements or other types of understandings regarding performance of the distributed system may also be used to establish optimization function 244. Schema 242 may similarly define weighting for these other types of information in optimization function 244 (e.g., a service level agreement may specify a maximum downtime of a particular duration, which may be treated similarly to a Required hierarchy information element; other types of understandings may be given different weights, etc.).

Once optimization function 244 is obtained, production environment simulation process 246 may be obtained. During production environment simulation process 246, operation of the distributed system under control of an agent (e.g., 250) may be simulated. During the simulation, agent 250 may modify the configuration of the simulated distributed system.

For example, production system model 249 (e.g., a digital twin) may define various aspects of operation of the distributed system that may be modified by an automation framework hosted by the distributed system. Agent 250 may be given control over (all or a portion of the functionality of) the automation framework thereby allowing agent 250 to modify operation of the distributed system.

During the simulation, various pieces of system information 248 from actual operation of the distributed system may be used to stimulate the system. For example, system information 248 may be used to establish conditions that have previously impacted operation of the distributed system. These previously encountered conditions may be used to exercise the simulation (e.g., simulate occurrences of the different conditions, such as power outages, malware attacks, etc.). Production system model 249 may also use any of system information 248 as input to facilitate simulation of the previously encountered conditions.

As the simulation progresses, quantities used as input to optimization function 244 may be monitored in the simulation. The monitored quantities may serve as input to optimization function 244 to obtain a quantification regarding desirability of operation of the simulated distributed system over time.

The resulting quantification(s) may then be used to drive a reward system or other update process for operation of agent 250. For example, agent 250 may include a machine learning model adapted to take, as input, information regarding operation of the distributed system and generate, as output, values usable to modify operation of the distributed system. The reward system may update weights or other features of a neural network of the machine learning model to train and update training of agent 250. In this manner, agent 250 may be trained or updates to already trained agents (e.g., 252) may be obtained.

Once obtained, trained agent or update 252 may be deployed to the distributed system. In this example shown in FIG. 2D, a trained agent instance 254 may be established as part of automation framework 234. Trained agent instance 254 may (i) monitor operation of the distributed system and (ii) change the operation accordingly based on the input-output relationships of the trained agent on which the instance is based.

For example, trained agent instance 254 may monitor (e.g., as input) (i) workload, (ii) power consumption, (iii) heat generation/temperature/other thermal characteristics, (iv) networking load, (v) errors in operation/device impairments/other logged events, and/or other aspects of operation of the distributed system. Any of the monitored quantities may be used as input to a trained neural network of the trained agent instance (or other entity) thereby generating various output quantities. The output quantities may be used to drive control of the distributed system. For example, the output quantities may be used (e.g., as indicators) to (i) change configuration settings of hardware/software components, (ii) pause/terminate software components, (iii) enable/disable hardware/software components, (iv) manage workloads (e.g., accept/reject workload requests), (v) obtain and provide system information 248, and/or perform other actions that may facilitate management of operation of the distributed system in a manner that improves the likelihood of provided computer implemented services being deemed desirable by stakeholders.

During operation of trained agent instance 254, agent 250 may continue to be trained. Consequently, new versions of agent 250 and/or updates may be applied to trained agent instance 254. The changes/new versions may cause, for example, weights or other aspects of the neural network to change value thereby causing trained agent instance 254 (e.g., after updating) to operate differently (e.g., may cause different control decisions to be made when new conditions that similar to previously encountered conditions impact the distributed system).

In FIG. 2D, device 111 is illustrated as a component of the distributed system (e.g., a production system). It will be appreciated that any number of trained agent instances may be deployed to other components of the distributed system.

Further, it will be appreciated that multiple trained agent instances 254 may be deployed to the distributed system. Different trained agent instances 254 may be trained, for example, using different optimization functions and may be tasked with managing only a portion of the functionality of the distributed system. Consequently, different trained agent instances may monitor different quantities and may generate different output usable to make control decisions with respect to different aspects of operation of the distributed system.

For example, automation framework 234 of device 111 may host multiple trained agent instances 254 that make different control decisions for automation framework 234. In a scenario in which the distribute system provides different types of services, for example, different trained agents may be trained to manage the distributed system to improve the likelihood of different such services meeting stakeholder expectations.

Thus, the flow shown in FIG. 2D may be used, for example, to train, update, and deploy agents that may dynamically and adaptively manage operation of a distributed system. However, it will be appreciated that the capacity of the trained agents may be limited based on the extent of the simulated operation of the distributed system.

Figure 2E:
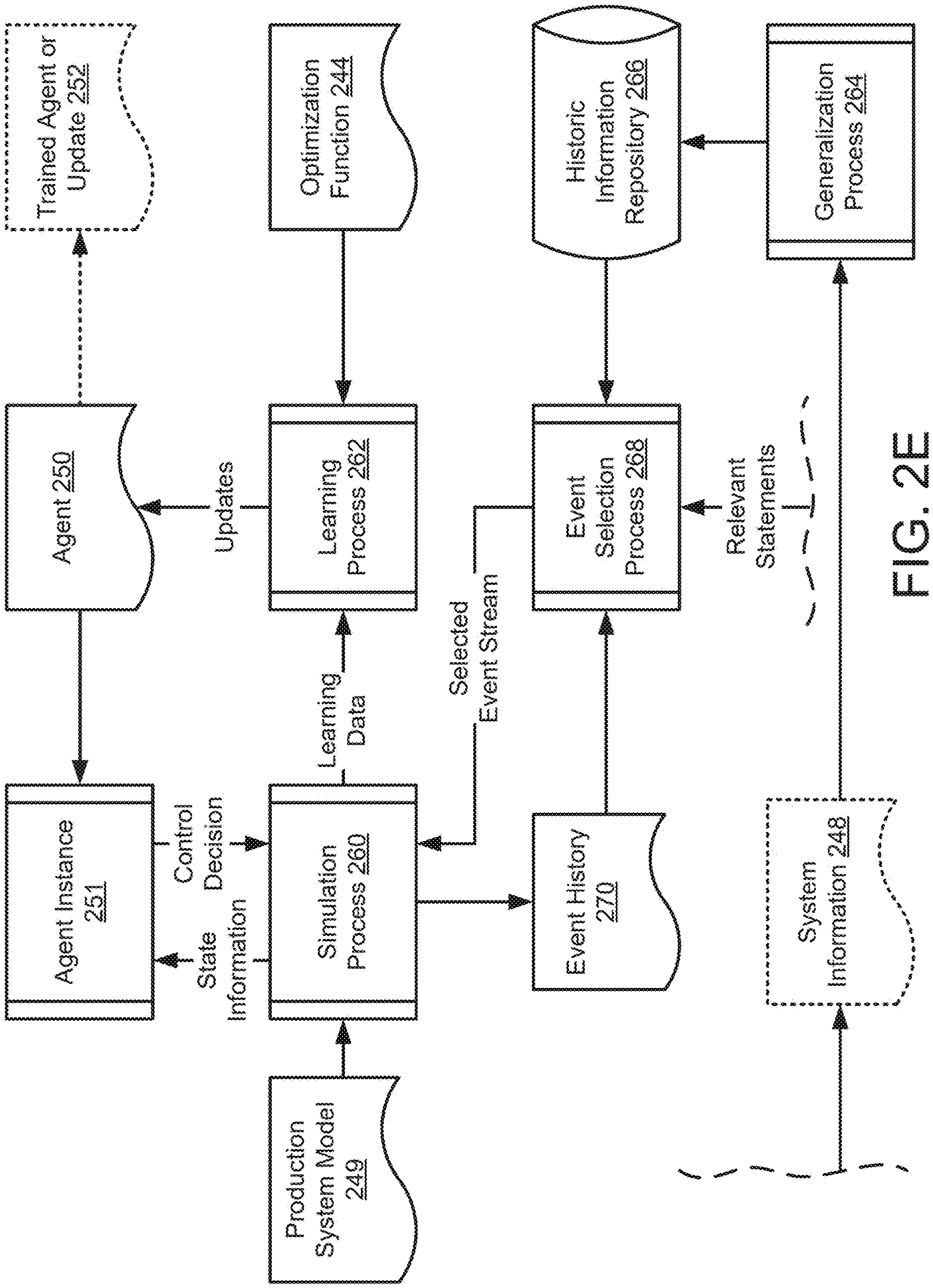

Turning to FIG. 2E, a fifth data flow diagram in accordance with an embodiment is shown. The fifth data flow diagram may illustrate data used in and data processing performed in managing devices of production systems using trained agents to address potentially unencountered events.

During the process of obtaining trained agents, as discussed with respect to FIG. 2D, the simulation of the production environment may be driven in part using historic system information 248. The use of historic system information 248 in the simulation may enable faithful reproduction of conditions that the production environment have encountered in the past. However, the quantity of available system information 248 may be limited and, in turn, limit the range of conditions that may be reproduced in the simulation. For example, new system designs may not have any actual system information available.

Returning to the discussion of FIG. 2E, to improve the diversity of events used during simulation of operation of the distributed system while under control of an agent instance (e.g., 251), system information 248 may be subjected to generalization processing (e.g., 264). During generalization processing, the events that actually impacted operation of a real system may be generalized (e.g., parameterized with variable content that may be updated). For example, for a network event from system information 248 that indicates a particular network communication load distribution on the distributed system over a period of time, the event may be generalized by replacing some of the information regarding the event with variables. The aforementioned process may be performed using a set of rules, a schema, or another processing modality to generalize any number of events to established generalized events for different types of events. The resulting generalized events may be stored in historic information repository 266 for future use. Each such generalized event may be given an event classification so that event selection process 268 may select particular types of events based on event history for inclusion in an event stream used to drive simulation process 260.

To train agent 250, an running instance of the agent (e.g., 251) may be coupled to simulation process 260 so that state information may be obtained and used as input to generate control decisions by the agent instance 251. The control decisions may be used by simulation process 260 to modify operation of the simulated distributed system.

The simulation of the distributed system may be monitored to obtain learning data usable to grade a quality of the control decisions during learning process 262. For example, during learning process 262, optimization function 244 may be used to quantify desirability of operation of the simulated distributed system. Based on the desirability, operation of agent 250 may be updated (e.g., by modifying weights or other aspects of agent 250). Any learning process (e.g., reinforced learning) may be used to update agent 250 based on the quality of operation of the simulated system (and/or based on the corresponding control decisions leading to the outcome). Consequently, agent instance 251 may be updated thereby changes the control decisions that it may make based on the state information. Once agent 250 reaches a desired level of quality of control decision making ability, agent 250 may be promoted to being a trained agent, or may be used as a basis for updating existing agents deployed to various distributed systems.

Returning to the discussion of simulation process 260, to simulate a broader variety of events than would otherwise be available using system information 248, event selection process 268 may select and add synthetic events to an event stream used to drive operation of simulation process. The event stream may define, in part, how some of the simulation of the distributed system works (e.g., may provide for simulation of load conditions, components failures, adversarial attacks, etc. that may impact a real system) to simulate variable behavior of a real distributed system.

To establish the event stream, a trained generative machine learning model (e.g., such as a transformer architecture, large language model, etc.) may ingest an event history 270 to predict a next set of events. Event history 270 may document events that have already impacted the simulated distributed system.

The selected events (e.g., event types) may then be retrieved from historic information repository 266, and the variable content may be replaced to establish complete instances of the types of events. The complete instances may then be added to the event stream (e.g., in the chronology specified by the prediction).

To complete the events, the variable content (e.g., variables) may be replaced with corresponding values. The values may be obtained, for example, via a random process or another process that may be driven to create particular types of events (e.g., high load conditions, low load conditions, etc.). Thus, the resulting events added to the event stream may, in fact, be events that have never been encountered by distributed systems in the real world. Accordingly, the aforementioned simulation process may be used to exercise agents across both known and unknown conditions that the agents may need to handle in the future.

When selecting the events and/or completing the events, any of the relevant statements, intermediate representations, and/or intents may be used, in part, to select and/or complete the events that will be added to the event stream. For example, the aforementioned information may be used as seeds for the trained generative machine learning model so that predicted event streams are more likely to exercise areas of higher interest. For example, if an intent specifies that downtime is to be minimized, the optimization goal (e.g., minimize downtime) may be used by the trained generative machine learning model to select relevant events (e.g., events likely to cause downtime). Likewise, the aforementioned information may be used to drive completion processes for generalized events from historic information repository (e.g., if an intent is to minimize cost during high load time, generalized events may be completed using higher values for loads to thoroughly exercise the high load space so that the agent may be better trained to address the aforementioned goal, if random values alone are used then the agent may be less likely to successfully accomplish the goal by virtue of reduced cycles spent training under those conditions in the simulation). Consequently, predefined amounts of variance may be introduced so that particular conditions (or probabilistically particular conditions) are simulated.

Similarly, the generalized events may be used to comply with predicted future occurrences of events generated by the trained generative machine learning model. For example, the trained generative machine learning model may predict that types of events are likely to occur (after the documented event history) and which have not been observed in real systems. The generalized events may be used to provide specific example instances of such types of events. In this manner, event streams may be generated that may effectively simulate conditions that have been previously encountered by real systems and that have not been encountered by real systems (e.g., synthesized events).

While predicting the future events, the trained generative machine learning model may use historic information repository 266 as a retrieval augmented generation (RAG) data source. In other words, some of the information from historic information repository 266 may be used as context for a prompt (e.g., part/all of event history 270). Consequently, the predicted future events from the trained generative machine learning model may include generalized events which, in turn, may be completed to establish the event stream. Consequently, variance may be introduced into the event stream to cover a broader range of conditions that may impact real world systems.

Thus, the resulting trained agent or update 252 may be more likely to manage operation of distributed systems in a manner that is more likely to meet stakeholder expectations. To further improve the likelihood of the operation of the distributed system meeting stakeholder expectations, multiple intents with respect to different components of the distributed system.

Figure 2F:
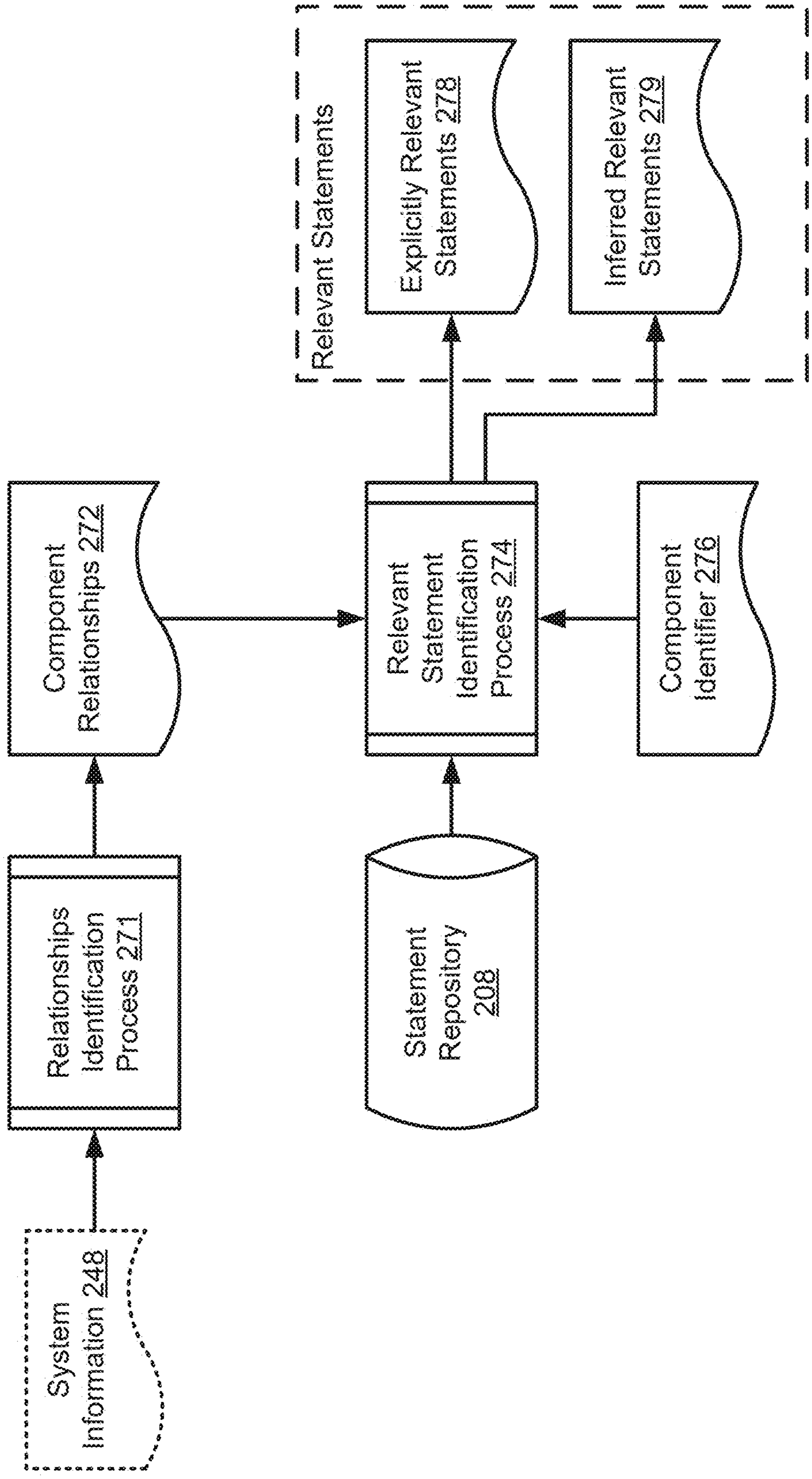

Turning to FIG. 2F, a sixth data flow diagram in accordance with an embodiment is shown. The sixth data flow diagram may illustrate data used in and data processing performed in deriving multiple intents for components of distributed systems.

As discussed with respect to FIGS. 2B and 2D, an intent may be used as a basis for establishing a policy, training an agent, etc. The intent may be obtained using relevant statements from statement repository 208.

Returning to the discussion of FIG. 2F, to identify relevant statements from statement repository 208, relevant statement identification process 274 may be performed. During relevant statement identification process 274, the statements in statement repository 208 may be screened for explicit relevancy with respect to different components of a distributed system. For example, a statement may be identified as being explicitly relevant by (i) identifying or otherwise indicating the component in the statement, (ii) based on metadata associating the statement with the component (e.g., metadata may indicate an entity that made the statement which itself might be related to the component, such as an administrator tasked with managing the component), and/or via other analysis process.

The identity (e.g., may be specified by component identifier 276) of the component for which a policy, trained agent, etc. is to be created or updated may be used to filter the statements based on the explicit relevancy to obtain explicitly relevant statements 278.

In addition to explicit relevancy, some statements may be inferred as being relevant to an identified component using component relationships 272 and/or a rule set (e.g., propagation rules) even though they are not explicitly relevant to the identified component. Because tacit statements may be partial and/or incomplete, they may not be explicitly relevant to a component but may actually be relevant to the component. For example, a statement regarding power consumption regarding a first component may be relevant to a second component that performs a similar function or cooperatively provides a function with the first component. Rather than requiring explicit relevancy in tacit statements, inferred relevancy may be made to improve the likelihood of all relevant information being used in establishing intent (e.g., with respect to a component). The inferred relevancy may be established on the basis that tacit statements with explicit relevancy to some components may also be relevant to other components so long as the other components that are related via particular relationships.

To identify the particular relationships, component relationships 272 may be used. Component relationships 272 may be a directed acyclic graph obtained during relationships identification process 271. The directed acyclic graph may include any number of nodes corresponding to components of the system (e.g., one node per instance of component) and edges between the nodes. The edges may be based on relationships between the corresponding components such as, for example, dependencies (e.g., one component relies on another for operation), data flows (e.g., data flows from one component to the other component), etc. In other words, based on relationships that indicate that related components have a threshold degree of influence on each other, shared purpose, etc.

To infer the relevancy of the tacit statements that have explicit relevancy, each of the nodes may be annotated with the statements that are explicitly relevant to them (e.g., to the corresponding components. The explicitly relevant statements may then be propagated along the edges to other nodes using propagation rules (and then annotated to the other nodes). This process may be repeated some number of times in accordance with the propagation rules. The result of the propagation may be that some nodes are annotated with some tacit statements that are explicitly relevant to the corresponding component, and other tacit statements that are not explicitly relevant to the corresponding component. The other tacit statements may be treated as being inferred as relevant to the corresponding component. The inferred as relevant tacit statement may be stored as inferred relevant statements 279 (e.g., for the identified component of component identifier 276, the annotations for node corresponding to the identified component, relevant statements for other component may be similarly derived).

The propagation rules may include various phases and may, for example, (i) limit the extent of the propagation across the directed acyclic graph (e.g., may limit based on numbers of edge traversals, (ii) limit the content of a tacit statement that is propagated such as, for example, filtering content of the tacit statement based on the relationship on which an edge is based which may result in a propagated tacit statement having reduced content when compared to the original on which the propagated tacit statement is based, any filtering mechanism may be used such as a large langue model, natural language processing, rules sets, etc., (iii) require relaxation operations to terminate propagation when an already annotated node is reached during propagation, (iv) require termination of propagation when nodes for which a tacit statement can be identified explicitly being irrelevant (e.g., a tacit statement regarding instant messaging reaching a database node), and/or otherwise manage the propagation process. Accordingly, the resulting mesh of tacit statements may be used to identify all relevant statements for each component even when explicit relevancy is not available.

Thus, using the flow shown in FIG. 2F, relevant statements with respect to an identified component may be obtained. The relevant statements may then be used to identify an intent for that component which may in turn be used to obtain a policy, a trained agent, etc. The aforementioned process may be repeated to obtain any number of policies, trained agents, etc. for any number of components. The components may be, for example, software components, executing services, databases, hardware components, distributed entities, etc.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage the operation of managed systems to provide desired computer implemented services. FIGS. 3A-3D illustrate methods that may be performed by the components of the system of FIG. 1. In the diagrams discussed below and shown in FIGS. 3A-3D, any of the operations may be repeated, performed in different orders, and/or performed in parallel with or in a partially overlapping in time manner with other operations.

Figure 3A:
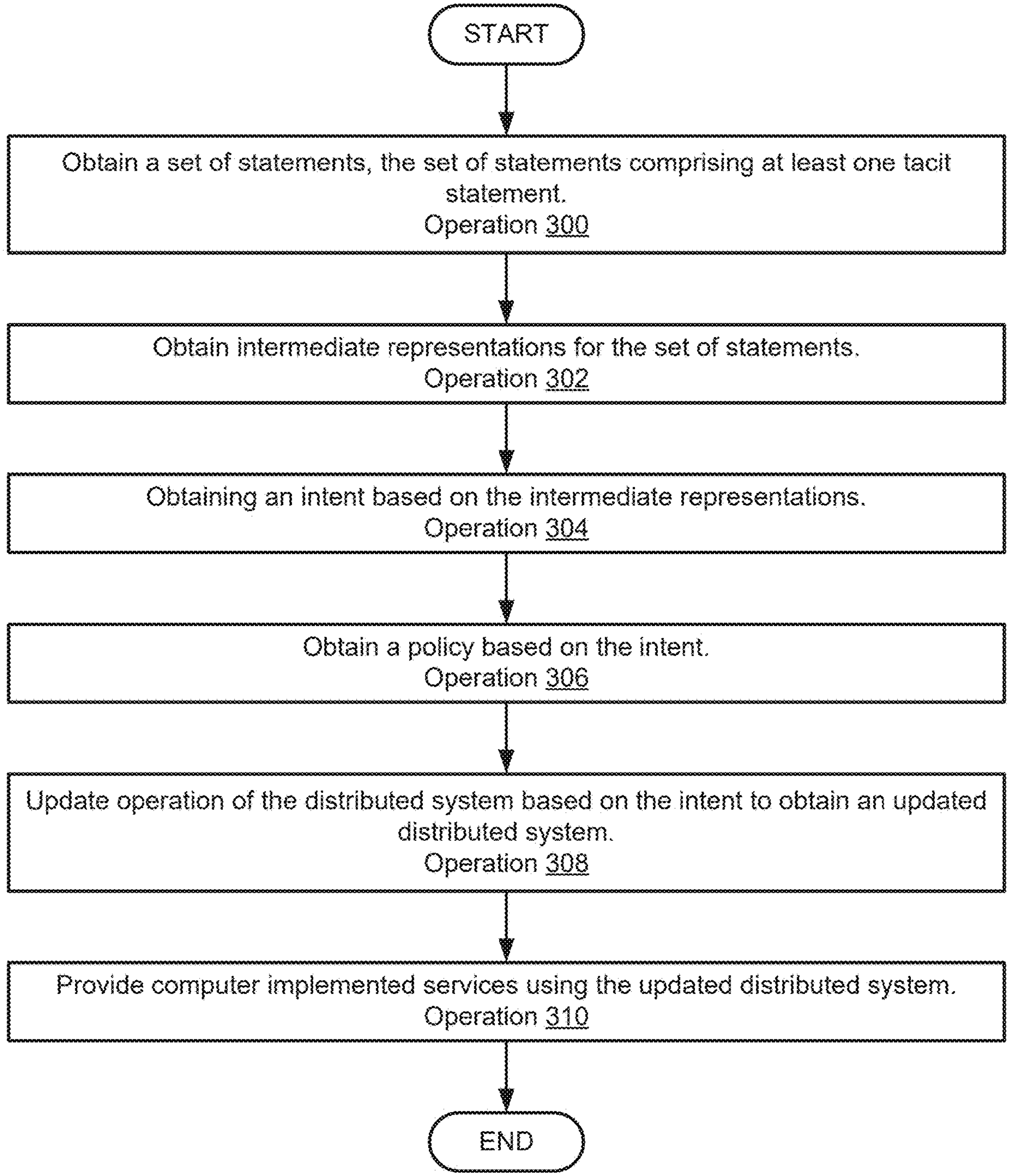
FIG. 3A-3D show flow diagrams illustrating methods in accordance with an embodiment.

Turning to FIG. 3A, a first flow diagram illustrating a method for managing operation of a system in accordance with an embodiment is shown. The method may be performed by any of the components of the system of FIG. 1.

At operation 300, a set of statements are obtained. The statements may be obtained from a statement repository. The set of statements may include at least one tacit statement. The set of statements may include any number and type of statements. For example, the statements may include a public statement which may also not explicitly indicate intent for a production system that is managed by an entity (e.g., the production system being a managed system).

At operation 302, intermediate representations for the set of statements may be obtained. The intermediate representations may be obtained by analyzing the set of statements using a schema to define a plurality of typified information elements. The typified information elements may be, for example, of the types hierarchy, aspect, instance, etc.

The set of statements may be analyzed by processing the set of statements using natural language processing to subdivide the set of statements into clauses; processing each of the clauses using natural language processing and the schema to identify a type of information corresponding to each clause; and populating the plurality of typified information elements based on the type of information corresponding to each clause and content of each clause. For example, each clause may be processed by performing word comparisons in the clause to dictionaries that associate specific words with the typified information elements. The comparison may thereby indicate the type of the information element for each clause. Each clause may then be further analyzed to identify, for example, aspects (e.g., types of information in each clause), instances (e.g., specific examples of the types of information in each clause), etc. The identified typified information elements may then be populated to obtain the intermediate representations.

As part of the analysis process, it will be appreciated that conflicts between some of the statements may arise. In such scenarios, information conflicts between the set of statements may be resolved prior to populating the plurality of typified information elements. The resolution process may be on any basis (e.g., temporal).

While described with respect to natural language processing, other methods of analysis (e.g., large language model, may be a trained generative machine learning model based on a transformer machine learning model architecture, may be trained using any sources of information) may be used without departing from embodiments disclosed herein.

At operation 304, an intent based on the intermediate representations is obtained. The intent may be obtained by populating a template using the information from in the intermediate representations, and/or via other processes.

At operation 306, a policy may be obtained based on the intent. The policy may be obtained, for example, by populating a template using the intent, applying a knowledge base to the intent, by taking into account information regarding the production system, and/or via other methods.

At operation 308, operation of the distributed system may be updated based on the intent to obtain an update distributed system. The operation may be updated by providing the policy to an automation framework hosted by the distributed system which may then used the policy to select and perform various actions.

For example, the automation framework may perform a workflow that includes any of interpreting the policy and existing characteristics of the distributed system to identify at least one deviation; identifying a corrective action based on the at least one deviation; and performing the corrective action to modify the operation of the distributed system to obtain the updated distributed system. The existing characteristics of the distributed system may include, for example, hosted software components, hardware components, configuration settings, etc. The interpretation may look for differences between a goal state indicated by the policy and the existing state of the distributed system (e.g., the production system).

The corrective action may be identified using any process. For example, a model (e.g., a trained machine learning model) that associates corrective actions with deviations may be used to identify the corrective actions.

At operation 310, computer implemented services may be provided using the updated distributed system. For example, operation of the updated distributed system may cause the computer implemented services to be provided in a manner that is more likely to meet intent of stakeholders.

The method may end following operation 310.

Thus, using the method shown in FIG. 3A, embodiments disclosed herein may improve the likelihood of computer implemented services meeting stakeholder expectations.

Figure 3B:
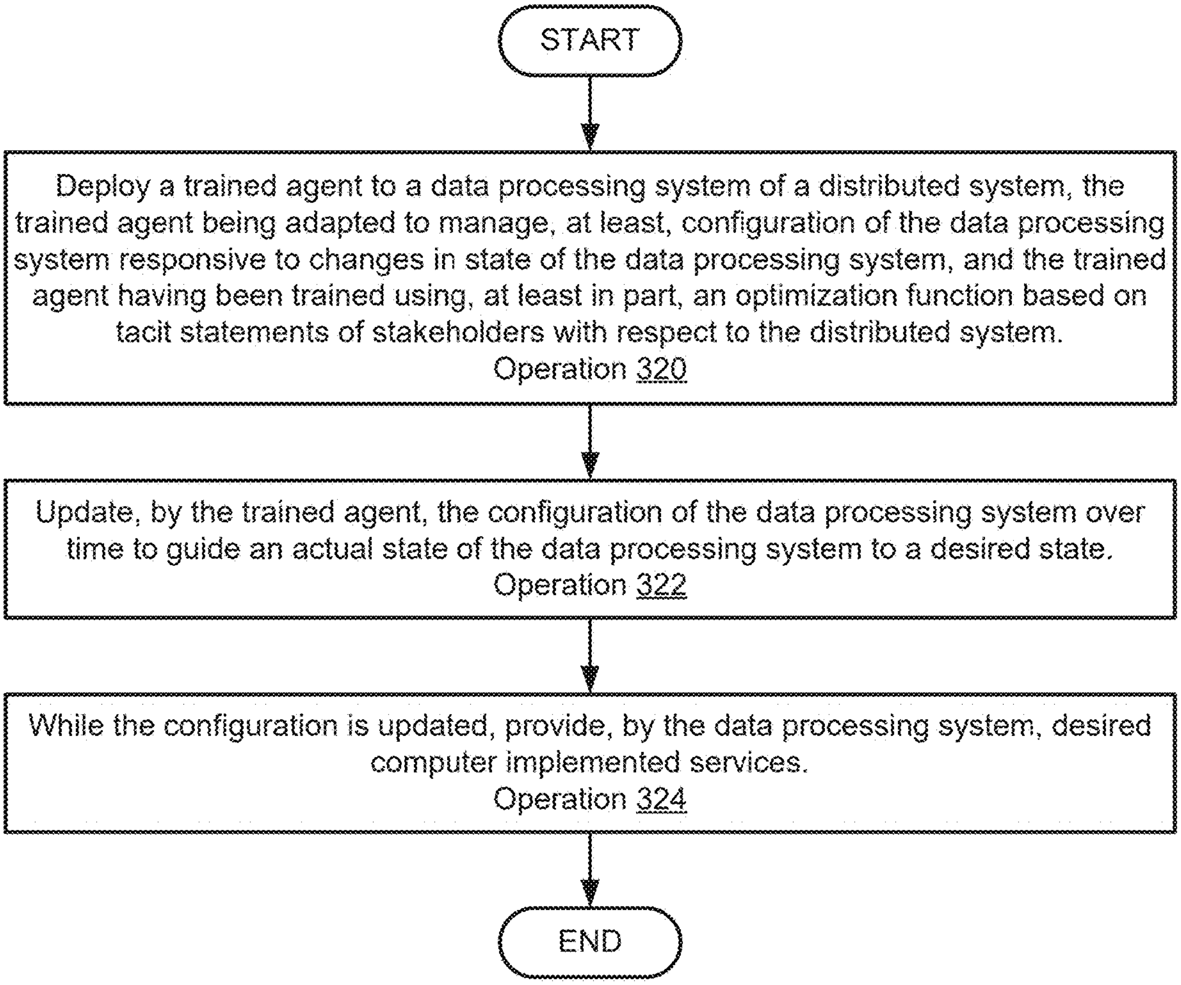

Turning to FIG. 3B, a second flow diagram illustrating a method for managing operation of a system in accordance with an embodiment is shown. The method may be performed by any of the components of the system of FIG. 1.

At operation 320, a trained agent is deployed to a data processing system of a distributed system. The trained agent may be adapted (e.g., trained) to manage, at least, a configuration of the data processing system responsive to changes in state of the data processing system. The trained agent may have been trained using, at least in part, an optimization function based on tacit statements of stakeholders with respect to the distributed system. The trained agent may be deployed by sending instructions and/or a copy of the trained agent to an automation framework hosted by the data processing system. The data processing system may instantiate an instance of the trained agent which, in turn, may being to manage the data processing system.

While the data processing system is operating and providing computer implemented services, operation of the data processing system may be monitored and used to update operation of the trained agent. For example, a reward based updating process may be used to modify the trained agent. The updating process may use, for example, the objective function to incentivize or disincentivize control decisions made by the trained agent.

During its operation, the trained agent (or at least a trained machine learning model of the agent) may ingest an actual state and/or changes to the actual state of at least a portion of the distributed system. For example, the trained agent may monitor the state (e.g., power consumption, workload, logged operating conditions, etc.) and uses the monitored quantities as input. The trained agent may select, based on at least the state and/or changes to the state, at least one selected from a group consisting of: an action to be performed by the at least the portion of the distributed system, and a change to a goal state of the distributed system, the distributed system comprising an automation framework adapted to attempt to move the distributed system from an actual state toward the goal state. For example, any may be output from the trained machine learning model of the trained agent. The output (e.g., goal state, specific actions, etc.) may then be used by the automation framework to modify operation of the distributed system accordingly.

At operation 322, the configuration of the data processing may be updated over time to guide an actual state of the data processing system to a desired state. For example, the trained agent may ingest information regarding operation of the data processing system and output control decisions which may be enforced by the automation framework.

At operation 324, while the configuration is updated, the data processing system may provide desired computer implemented services.

The method may end following operation 324.

Thus, using the method discussed with respect to FIG. 3B, embodiments disclosed herein may facilitate management of a distributed system dynamically over time.

Figure 3C:
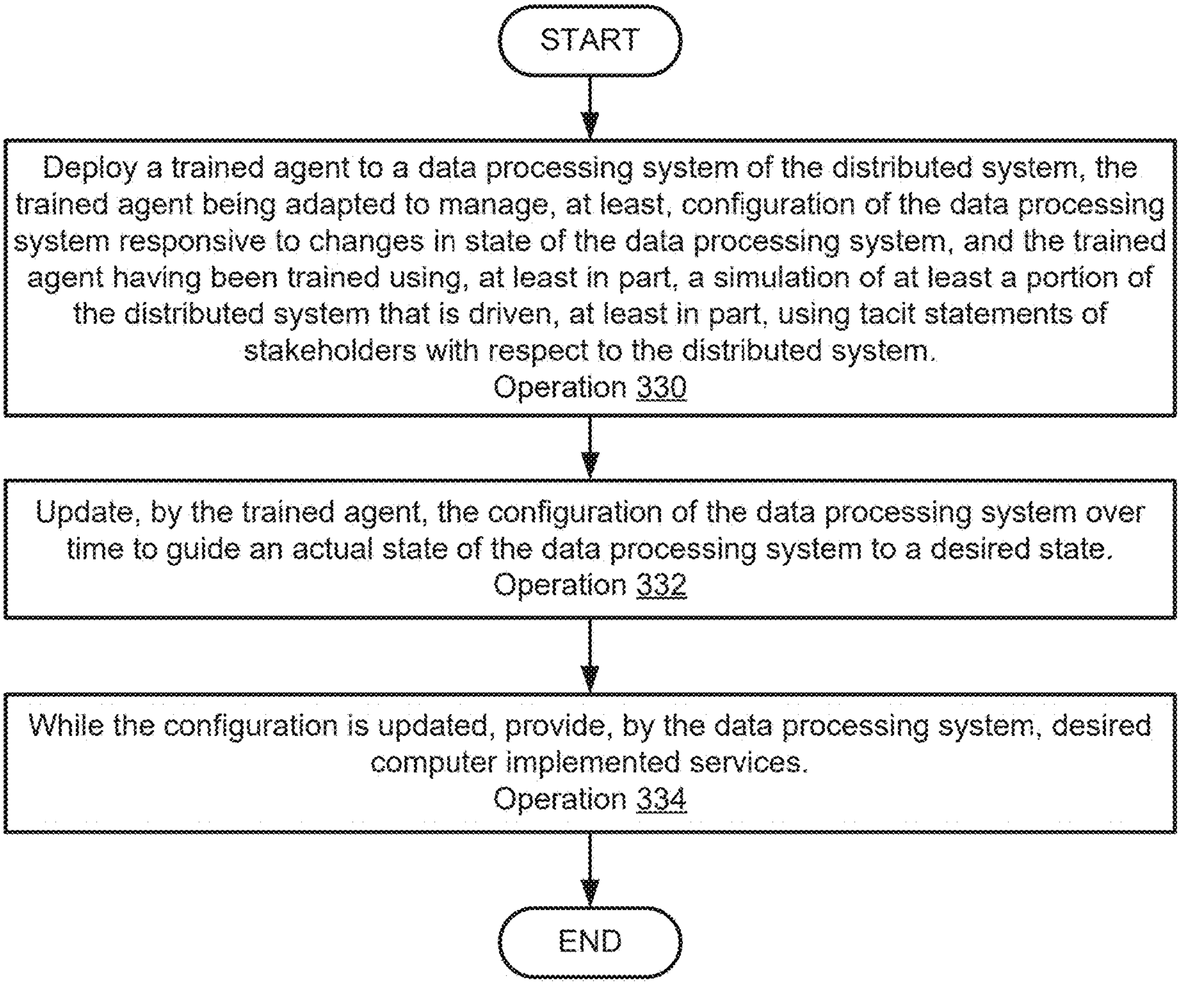

Turning to FIG. 3C, a third flow diagram illustrating a method for managing operation of a system in accordance with an embodiment is shown. The method may be performed by any of the components of the system of FIG. 1.

At operation 330, a trained agent is deployed to a data processing system of a distributed system. The trained agent may be adapted (e.g., trained) to manage, at least, a configuration of the data processing system responsive to changes in state of the data processing system. The trained agent may have been trained using, at least in part, a simulation of at least a portion of the distributed system that is driven, at least in part, using tacit statements of stakeholders with respect to the distributed system.

The trained agent may be deployed by sending instructions and/or a copy of the trained agent to an automation framework hosted by the data processing system. The data processing system may instantiate an instance of the trained agent which, in turn, may begin to manage the data processing system.

The simulation used to obtain the trained agent may be implemented using a digital twin. To exercise the digital twin, an event stream may be established and used to drive operation of the digital twin. The event stream may be selected using a trained generative machine learning model. The trained generative machine learning model may predict future events based on past events that have been previously simulated. The predicted events may be generated in part using generalized events that are parameterized (e.g., may serve as a RAG data sources for the trained generative machine learning model). Such predicted generalized events may be completed randomly or in a directed manner (e.g., may use intent, intermediate representations, tacit statements, etc. as seeds) to force exercise of the simulation in a particular manner (e.g., high load condition, low load condition, etc. which may be indicated by the seeds). Thus, the resulting event stream may direct the simulation toward conditions that have not been encountered. Accordingly, the resulting trained model may be better able to manage distributed systems across a broader range of conditions (e.g., in particular when compared to models trained using only historic information regarding conditions that have been encountered by distributed systems).

At operation 332, the configuration of the data processing may be updated over time to guide an actual state of the data processing system to a desired state. For example, the trained agent may ingest information regarding operation of the data processing system and output control decisions which may be enforced by the automation framework.

At operation 334, while the configuration is updated, the data processing system may provide desired computer implemented services.

The method may end following operation 334.

Thus, using the method described with respect to FIG. 3C, embodiments disclosed herein may facilitate management of systems under broader ranges of conditions than have been encountered in real world systems (e.g., yet).

Figure 3D:
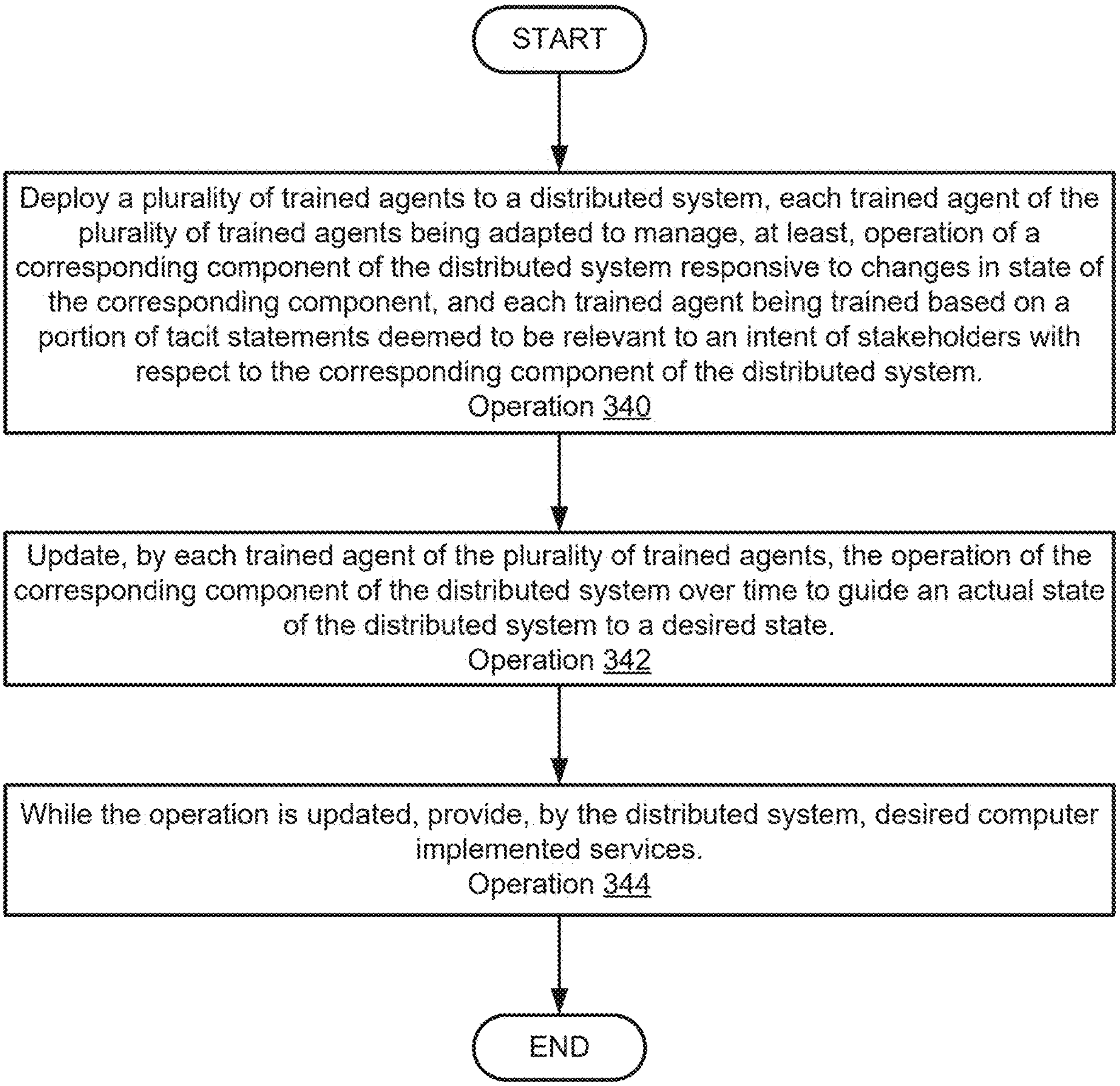

Turning to FIG. 3D, a fourth flow diagram illustrating a method for managing operation of a system in accordance with an embodiment is shown. The method may be performed by any of the components of the system of FIG. 1.

At operation 340, a plurality of trained agents may be deployed to a distributed system. Each trained agent of the plurality of trained agents may be adapted to manage, at least, operation of a corresponding component of the distributed system responsive to changes in state of the corresponding component. Each trained agent may be trained based on a portion of tacit statements deemed to be relevant to an intent of stakeholders with respect to the corresponding component of the distributed system.

For example, statements from a statement repository may be filtered for relevancy with respect to a component. The filtered statements may be used to derive an intent, which in turn may be used to obtain the trained agent.

The statements may be filtered based on explicit relevancy and inferred relevancy. The statements may be deemed explicitly relevant if content or metadata of a statement indicates that it is relevant to the component. In contrast, other statements may be inferred as relevant to a component based on relationships between other components (to which the other statements are explicitly relevant) and the component. The relationships may be defined by a directed acyclic graph.

The relationships may be limited by propagation rules. For example, the propagation rules may limit the number of edges interconnecting nodes that may be used as a basis for inferring that a statement is relevant to a given node.

In an embodiment, the inferred relevancy may be identified by (i) annotating nodes with explicitly relevant statements, (ii) sequentially propagating the statements along edges and annotating other nodes with the statements (a statement annotated to a first node which is connected to a second node via an edge may be propagated to the second node during a first propagation round, and may then be subsequently propagated to a third node during a second round presuming another edge connects the second and third nodes), and (iii) limiting or otherwise modifying the propagation using the propagation rules (e.g., my require pruning based on relevance, relaxation, partial propagation of some but not all content of a statement, etc. thereby establishing a mesh of statements). The result may be nodes annotated with some statements that are explicitly relevant and others that are not explicitly relevant but that will be treated as having inferred relevancy to the component corresponding to the node.

At operation 342, the operation of corresponding components may be updated by the trained agents over time to guide an actual state of the distributed system to a desired state. The operation may be guided by, for a given component, ingesting information regarding the state and outputting control decisions for the component. The control decisions may be used to manage operation of the given component.

At operation 344, while the operation is updated, desired computer implemented services may be provided by the distributed system.

The method may end following operation 344.

Thus, using the method described with respect to FIG. 3D, embodiments disclosed herein may facilitate management of systems at a granular level by identifying intents with respect to various components without requiring relevancy between statements and the components to be made explicit.

Figure 4:
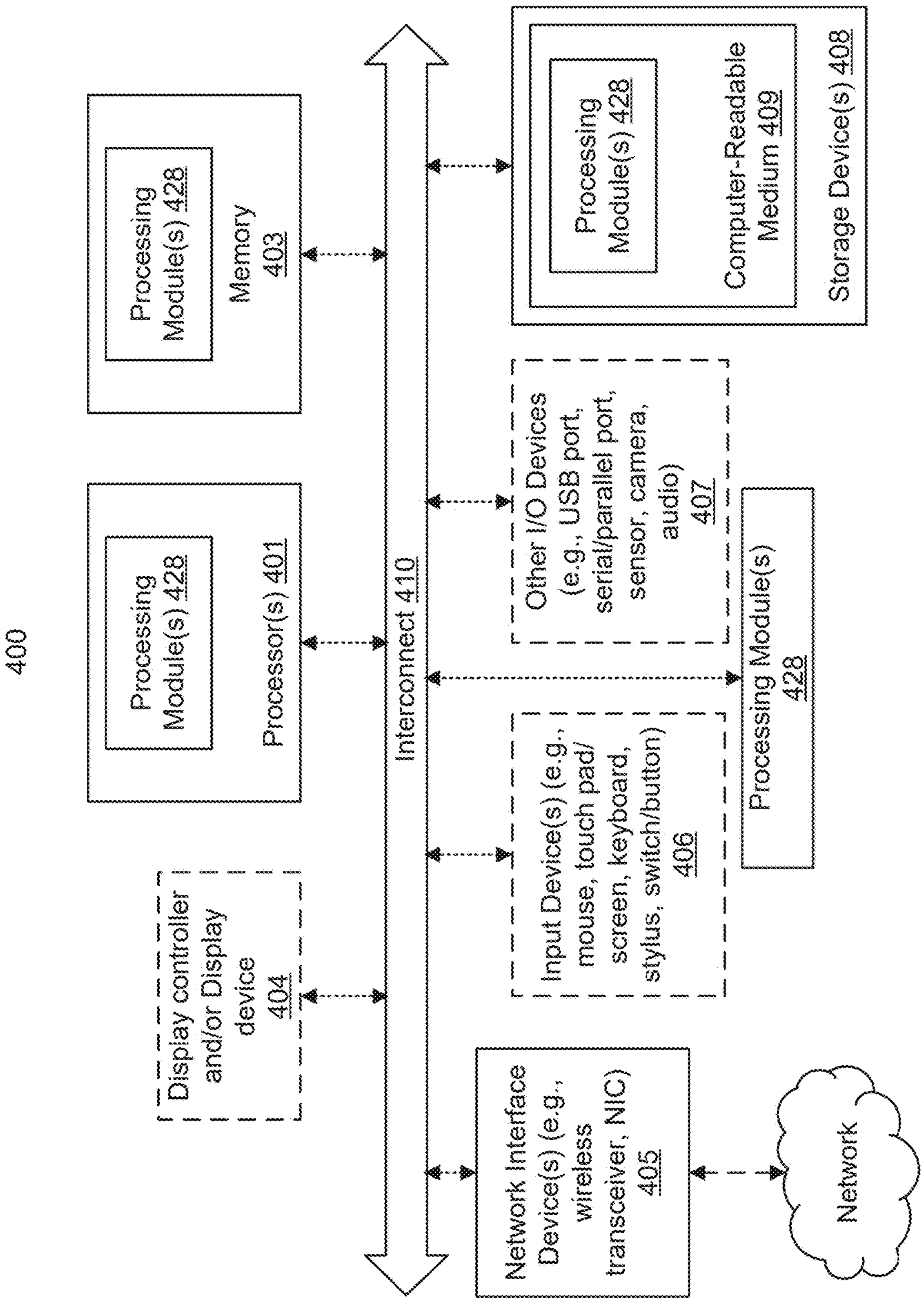
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of the data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a distributed system, the method comprising:

deploying a plurality of trained agents to the distributed system, each trained agent of the plurality of trained agents being adapted to manage, at least, operation of a corresponding component of the distributed system responsive to changes in state of the corresponding component, and each trained agent being trained based on a portion of tacit statements deemed to be relevant to an intent of stakeholders with respect to the corresponding component of the distributed system;

updating, by each trained agent of the plurality of trained agents, the operation of the corresponding component of the distributed system over time to guide an actual state of the distributed system to a desired state; and while the operation is updated, providing, by the distributed system, desired computer implemented services.

2. The method of claim 1, wherein, for a first trained agent of the plurality of trained agents, a first portion of tacit statements, deemed to be relevant to a first intent of the stakeholders with respect to a first component of the distributed system, comprises:

a first tacit statement that is explicitly relevant to the first component of the distributed system; and a second tacit statement that is not explicitly relevant to the first component of the distributed system but is inferred as being relevant to the first component based on relationships between components of the distributed system.

3. The method of claim 2, wherein the relationships are dependencies.

4. The method of claim 2, wherein the second tacit statement is inferred as being relevant based on a directed acyclic graph, and a propagation rule.

5. The method of claim 4, wherein the directed acyclic graph comprises nodes corresponding to the components, and edges between the nodes corresponding to the relationships.

6. The method of claim 5, wherein the second tacit statement is explicitly relevant to a second component of the components of the distributed system, the first component is related to the second component via an edge of the edges, and the propagation rule indicates that the second tacit statement is relevant to the first component based on the edge.

7. The method of claim 6, wherein the propagation rules indicates that the second tacit statement is to be sequentially propagated from a nodes of the nodes corresponding to the second component to other nodes via the edges.

8. The method of claim 7, wherein the propagation rule limits a number of the edges across which second tacit statement is allowed to be propagated.

9. The method of claim 1, wherein each trained agent of the plurality of trained agents operates independently.

10. The method of claim 1, wherein the tacit statements comprise at least one derived tacit statement based on public information from the stakeholders, the tacit statements being private statements.

11. The method of claim 10, wherein the tacit statements indicates at least one goal of the stakeholder with respect to the distributed system that is to be accomplished.

12. The method of claim 11, wherein the goal is not defined in terms of operation of the distributed system.

13. The method of claim 12, wherein the distributed system is a production system of the distributed system that contributed to, at least in part, primary computer implemented services provided by the distributed system.

14. A non-transitory machine-readable medium having instructions stored therein, which when executed by a processor, cause operations for managing a distributed system to be performed, the operations comprising:

deploying a plurality of trained agents to the distributed system, each trained agent of the plurality of trained agents being adapted to manage, at least, operation of a corresponding component of the distributed system responsive to changes in state of the corresponding component, and each trained agent being trained based on a portion of tacit statements deemed to be relevant to an intent of stakeholders with respect to the corresponding component of the distributed system;

updating, by each trained agent of the plurality of trained agents, the operation of the corresponding component of the distributed system over time to guide an actual state of the distributed system to a desired state; and while the operation is updated, providing, by the distributed system, desired computer implemented services.

15. The non-transitory machine-readable medium of claim 14, wherein, for a first trained agent of the plurality of trained agents, a first portion of tacit statements, deemed to be relevant to a first intent of the stakeholders with respect to a first component of the distributed system, comprises:

a first tacit statement that is explicitly relevant to the first component of the distributed system; and a second tacit statement that is not explicitly relevant to the first component of the distributed system but is inferred as being relevant to the first component based on relationships between components of the distributed system.

16. The non-transitory machine-readable medium of claim 15, wherein the relationships are dependencies.

17. The non-transitory machine-readable medium of claim 15, wherein the second tacit statement is inferred as being relevant based on a directed acyclic graph, and a propagation rule.

18. A system, comprising:

a processor; and a memory coupled to the processor to store instructions, which when executed by the processor, cause operations for managing a distributed system to be performed, the operations comprising:

deploying a plurality of trained agents to the distributed system, each trained agent of the plurality of trained agents being adapted to manage, at least, operation of a corresponding component of the distributed system responsive to changes in state of the corresponding component, and each trained agent being trained based on a portion of tacit statements deemed to be relevant to an intent of stakeholders with respect to the corresponding component of the distributed system;

updating, by each trained agent of the plurality of trained agents, the operation of the corresponding component of the distributed system over time to guide an actual state of the distributed system to a desired state; and while the operation is updated, providing, by the distributed system, desired computer implemented services.

19. The system of claim 18, wherein, for a first trained agent of the plurality of trained agents, a first portion of tacit statements, deemed to be relevant to a first intent of the stakeholders with respect to a first component of the distributed system, comprises:

a first tacit statement that is explicitly relevant to the first component of the distributed system; and a second tacit statement that is not explicitly relevant to the first component of the distributed system but is inferred as being relevant to the first component based on relationships between components of the distributed system.

20. The system of claim 19, wherein the relationships are dependencies.

* * * * *